United States Patent [19]
Sato et al.

[11] Patent Number: 5,751,133
[45] Date of Patent: May 12, 1998

[54] CHARGE/DISCHARGE CONTROL METHOD, CHARGE/DISCHARGE CONTROLLER, AND POWER GENERATION SYSTEM WITH CHARGE/DISCHARGE CONTROLLER

[75] Inventors: Hiroshi Sato; Kimitoshi Fukae, both of Nara; Nobuyoshi Takehara, Soraku-gun, all of Japan

[73] Assignee: Canon Kabushiki Kaisha, Tokyo, Japan

[21] Appl. No.: 622,584

[22] Filed: Mar. 26, 1996

[30] Foreign Application Priority Data

Mar. 29, 1995 [JP] Japan .................. 7-071623

[51] Int. Cl.$^6$ .................. H01M 10/46
[52] U.S. Cl. .................. 320/13; 320/21; 320/61; 136/DIG. 2
[58] Field of Search .................. 320/2, 5, 12, 13, 320/14, 21, 28, 30, 39, 61; 136/DIG. 2

[56] References Cited

U.S. PATENT DOCUMENTS

| | | |
|---|---|---|
| 4,240,021 | 12/1980 | Kashima et al. .................. 320/2 |
| 4,714,868 | 12/1987 | Maruyama et al. .................. 320/5 |
| 5,086,267 | 2/1992 | Janda et al. .................. 320/61 X |
| 5,321,347 | 6/1994 | Chien .................. 320/21 |
| 5,343,137 | 8/1994 | Kitaoka et al. .................. 320/13 |
| 5,414,306 | 5/1995 | Kanno et al. .................. 307/87 |
| 5,477,124 | 12/1995 | Tamai .................. 320/13 |
| 5,493,197 | 2/1996 | Eguchi et al. .................. 320/5 |
| 5,568,038 | 10/1996 | Tatsumi .................. 320/14 |

*Primary Examiner*—Edward Tso
*Attorney, Agent, or Firm*—Fitzpatrick, Cella, Harper & Scinto

[57] ABSTRACT

In a charge/discharge control system for a charging the output of a storage battery from a solar cell, the output voltage of the storage battery connected to a node between the solar cell output and a load is detected. If the detected voltage is less than a first setting value, discharge from the storage battery to the load is inhibited. The discharge inhibition is released in response to a discharge inhibition release command after the storage battery voltage increases to a second setting value.

2 Claims, 8 Drawing Sheets

FIG. 2A

SOLAR CELL CHARGING CURRENT

FIG. 2B

STORAGE BATTERY VOLTAGE

FIG. 2C

DISCHARGE INHIBITING STATE

FIG. 2D

LOAD CONNECTING STATE

SOLAR CELL CHARGE CURRENT

FIG. 4B

STORAGE BATTERY VOLTAGE

FIG. 4C

DISCHARGE INHIBITING STATE

FIG. 4D

LOAD CONNECTION STATE

FIG. 4E

RESET INPUT

SOLAR CELL CHARGE CURRENT

FIG. 6B

STORAGE BATTERY VOLTAGE

FIG. 6C

DISCHARGE INHIBITING STATE

FIG. 6D

LOAD CONNECTION STATE

FIG. 6E

TIMER CONTROL INPUT

SOLAR CELL CHARGE CURRENT

FIG. 8B

STORAGE BATTERY VOLTAGE

FIG. 8C

DISCHARGE INHIBITING STATE

FIG. 8D

LOAD CONNECTING STATE

FIG. 8E

SOLAR CELL VOLTAGE (SUNSHINE) INPUT

CHARGE/DISCHARGE CONTROL METHOD, CHARGE/DISCHARGE CONTROLLER, AND POWER GENERATION SYSTEM WITH CHARGE/DISCHARGE CONTROLLER

BACKGROUND OF THE INVENTION

1. Field of the Invention

The present invention generally relates to a charge/discharge control method, a charge/discharge controller for practicing the charge/discharge control method, and a power generation system with the charge/discharge controller. The invention particularly relates to a charge/discharge control method of efficiently controlling the charge of electricity from a d.c. power source with an unstable output to a storage battery and the discharge from the battery to the d.c. power source, a charge/discharge controller for practicing the charge/discharge control method, and a power generation system with the charge/discharge controller.

2. Related Background Art

An output (generated power) of a d.c. power source such as a solar cell changes with the quantity of incident light to the solar cell. During the night when light from the sun is not applied, the function of the d.c. power source does not operate. A system, which efficiently utilizes a d.c. power source having an unstable output such as a solar cell, is known in which a storage battery is provided for storing an output power of the solar cell when it becomes necessary, and the storage battery is used as an auxiliary power source when there is no output power of the solar cell.

Figure 1:
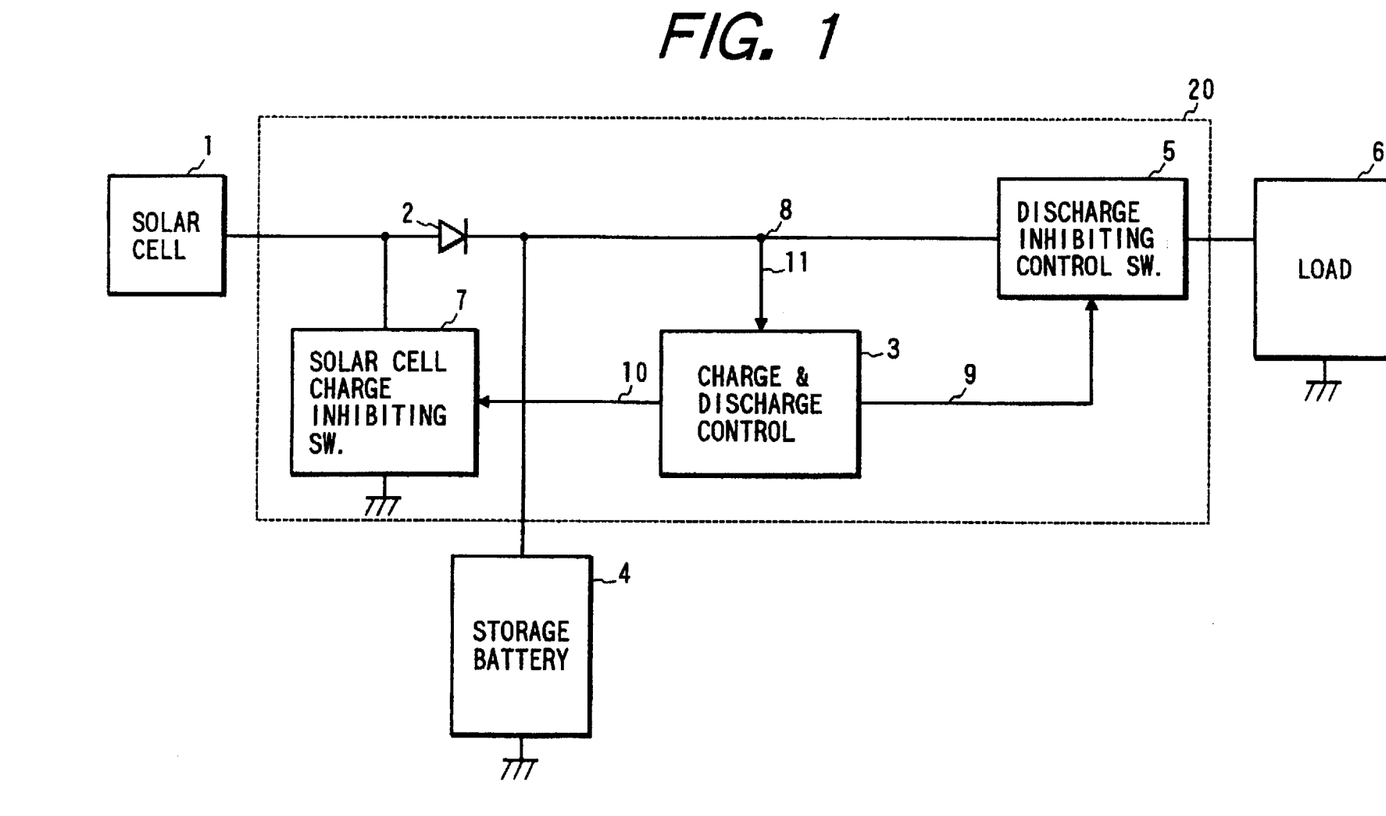
FIG. 1 is a diagram showing an example of the structure of a conventional power generation system having a charge/discharge controller.

FIG. 1 is a diagram showing an example of the structure of such a system. In FIG. 1, reference numeral 1 represents a solar cell as an unstable power source, reference numeral 2 represents a reverse current stopper diode, reference numeral 3 represents a charge/discharge controller, reference numeral 4 represents a storage battery, reference numeral 5 represents a discharge inhibiting control semiconductor switching element, reference numeral 6 represents a load, reference numeral 7 represents a solar cell charge inhibiting switching element, reference numeral 8 represents a storage battery voltage detector, reference numeral 9 represents a discharge inhibiting control signal, reference numeral 10 represents a charge inhibiting control signal, reference numeral 11 represents a detected voltage signal, and reference numeral 20 represents a charge/discharge controller.

In the system shown in FIG. 1, an output of the solar cell is supplied via the reverse current stopper diode 2 to the storage battery 4. The storage battery 4 and reverse current stopper diode 2 are connected to the load 6 via the discharge inhibiting control switching means 5 such as a semiconductor switching element. The solar battery charge inhibiting switching means (element) 7 has one end connected between the solar battery 1 and reverse current stopper diode 2. In accordance with a value of a detected voltage signal supplied from the storage battery voltage detector 8, the charge/discharge controller 3 inputs the discharge inhibiting control signal 9 to the discharge inhibiting control semiconductor switching element 5, or the charge inhibiting control signal 10 to the solar cell charge inhibiting switching element 7, to thereby inhibit the charge or discharge. Generally, the solar cell charge inhibiting switching element 7 is turned on in response to the charge inhibiting control signal to short an output of the solar cell 1 and inhibit the charge, whereas the discharge inhibiting semiconductor switching element 5 is turned off in response to the discharge inhibiting control signal 9 to inhibit an output to the load 6.

FIGS. 2A to 2D are timing charts illustrating an operation example of the system shown in FIG. 1.

Figure 2A:
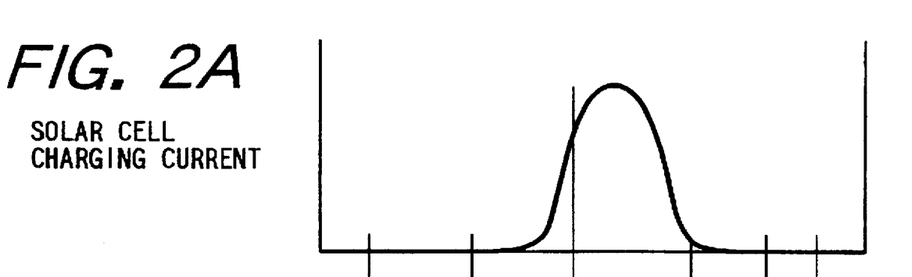
FIGS. 2A to 2D are timing charts illustrating an operation example suitable for the conventional power generation system having a charge/discharge controller.
Figure 2B:
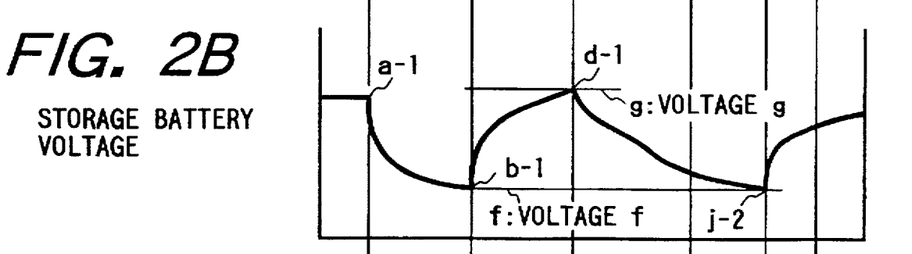
Figure 2C:
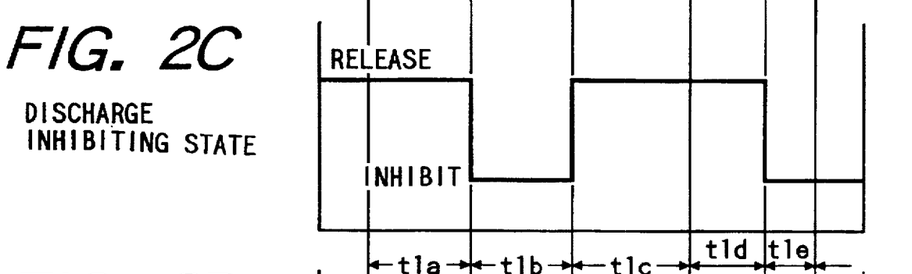
Figure 2D:
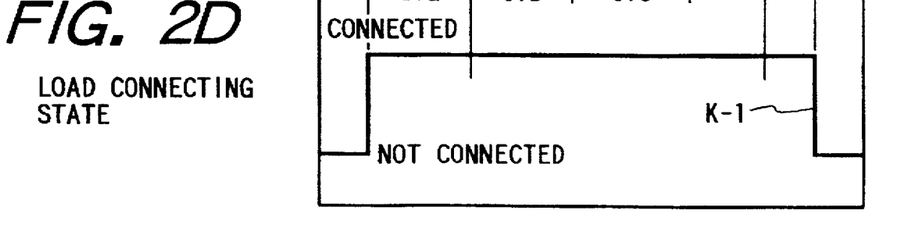

In FIGS. 2A to 2D, a change in a charge current of the solar cell is shown in FIG. 2A, a change in a voltage of the storage battery is shown in FIG. 2B, a waveform of the discharge inhibiting control signal 9 of FIG. 1 is shown in FIG. 2C, and a connection state of the load is shown in FIG. 2D.

In FIGS. 2A to 2D, f indicates a discharge inhibition voltage, g indicates a voltage at which a discharge inhibition by the charge/discharge controller is released, a-1 indicates a start timing of a load connection, b-1 indicates a discharge start timing at the discharge inhibition voltage f, d-1 indicates a timing when the storage battery takes the predetermined voltage g because of the charge of the solar cell, when the discharge inhibition by the charge/discharge controller is released, and when the connection to the load is permitted, i-1 indicates a re-start timing of discharge inhibition when the storage battery again takes the predetermined voltage f, and k-1 indicates an end timing of the load connection.

It is assumed that the start timing of FIGS. 2A to 2D is set in a state in which substantially no electromotive force is generated in the solar cell 1 shown in FIG. 1 and substantially no current is stored via the reverse current stopper diode 2 into the storage battery 1, that the charge/discharge controller is not in the discharge inhibition state at this start timing, and that the load is connected at the timing a-1.

Under these conditions, the storage battery 4 is discharged as the time lapses and its voltage gradually lowers as indicated in FIG. 2B.

The voltage of the storage battery is detected by the storage battery voltage detector 8 and supplied to the charge/discharge controller 3. When the voltage lowers to the voltage f preset for the storage battery 4 at which the discharge is inhibited, the charge/discharge controller 3 outputs the discharge inhibiting control signal 9 and turns off the discharge inhibiting control semiconductor switching element 5. This timing is indicated at b-1 in FIG. 2B. When the discharge inhibiting control semiconductor switch is turned off, current will not flow through the load 6 so that the discharge of the storage battery 4 is stopped.

When a supply of the power to the load 6 is stopped, the voltage of the storage battery 4 starts rising (in FIG. 2B). In most cases, in order to avoid oscillation of an over discharge preventing circuit, the discharge inhibition is released after the voltage of the storage battery 4 rises to the voltage g preset for the storage battery 4 because of the voltage self-recovery or the charge by the solar cell 1 connected, the voltage g being higher than the predetermined voltage f. Discharge automatically starts again when the voltage of the storage battery 4 rises to the predetermined voltage g. If the load 6 is being connected at the time of discharge inhibition, discharge starts again and when a supply of power resumes the load 6 is automatically supplied with the power. When the solar cell 1 is supplied with light of the sun and power generation starts, this power charges the storage battery or is supplied to the load.

With the system structure described above, a discharge inhibition state of the storage battery 4 is automatically released as the voltage of the storage battery 4 rises. However, in this case the following problems may occur.

Consider, for example, the case where the load 6 is an illumination lamp, and where the voltage of the storage battery 4 lowers and the discharge inhibition state occurs while the illumination lamp is used during the night. In this case, power generation of the solar cell 1 during the day time (light of the sun being applied to the solar cell 1) charges the storage battery 4 and raises its voltage so that the discharge inhibition is released. If the switch of the illumination lamp is not turned off, i.e., if the load 6 is not disconnected, the illumination lamp is turned on during the day time and power is consumed wastefully. As a result, power of the solar cell 1 is consumed by the illumination lamp (load 6) and the storage battery 4 is not charged or is almost not charged. Therefore the illumination lamp cannot be turned on during the night when it is required to be operated.

In other words, after power stored in the storage battery 4 is once used completely, it is difficult to sufficiently charge the storage battery and efficiently use the system.

SUMMARY OF THE INVENTION

It is an object of the present invention to solve the above-described problems and provide a charge/discharge method, a charge/discharge apparatus, and a system with the charge/discharge apparatus, capable of improving the reliability of the system by allowing an output of a power source of power generation means such as a solar cell to be charged, even if a discharge inhibition state occurs.

It is another object of the present invention to provide a charge/discharge method, a charge/discharge apparatus, and a system (power generation system) with the charge/discharge apparatus, allowing a load of the system to be operated only when necessary through the charge/discharge control and capable of solving a conventional problem. The conventional problem is that a discharge inhibition state caused by a voltage drop of the storage battery due to discharge and stoppage of discharge to the load (supply of power), is not released even when the voltage of the storage battery rises by a supply of current from a power source. Therefore, in a system with a solar cell, power from the solar cell is not used for charging the storage battery and is consumed by the load, the solar cell being unable to sufficiently charge the storage battery.

It is a further object of the present invention to provide a charge/discharge system (power generation system) capable of improving the reliability of the whole system, stabilizing the operation of the system, and efficiently charging a storage battery, because power is not consumed wastefully during the charge period of the storage battery by not releasing the discharge inhibition through monitoring a voltage of the storage battery.

It is a still further object of the present invention to provide a charge/discharge system (power generation system) capable of improving the reliability of the whole system, stabilizing the operation of the system, and efficiently charging a storage battery, because power is not consumed wastefully during the charge period of the storage battery.

It is another object of the present invention to provide a charge/discharge method, a charge/discharge apparatus, and a charge/discharge system, capable of reliably and efficiently operating the system, without any malfunction which might otherwise be caused by a manual switch and without a manipulation of a reset switch, because an operation of a load is automatically performed by releasing the discharge inhibition in accordance with an output of a timer or an output of power generation means such as a solar cell.

It is still another object of the present invention to provide a charge/discharge control method of charging an output of a d.c. power source having an unstable output into a storage battery and discharging the stored power, the method comprising the steps of: detecting an output voltage of the storage battery; inhibiting a discharge from the storage battery if the detected voltage is a predetermined voltage or lower; and releasing the discharge inhibition in response to a discharge inhibition release command after the voltage of the storage battery rises to a predetermined value.

It is a further object of the present invention to provide a charge/discharge controller comprising: a d.c. power source having an unstable output; a charge/discharge control circuit connected to a storage battery for controlling the charge/discharge of the storage battery; and switching means for controlling an output to a load in response to a signal from the charge/discharge control circuit, wherein the charge/discharge control circuit includes means for releasing the discharge inhibition.

It is a still further object of the present invention to provide a power generation system comprising a charge/discharge controller and a load connected to the charge/discharge controller, the charge/discharge controller comprising: a d.c. power source having an unstable output; a storage battery; a charge/discharge control circuit connected to the d.c. power source and the storage battery for controlling the charge/discharge of the storage battery; and switching means for controlling an output to a load in response to a signal from the charge/discharge control circuit, wherein the charge/discharge control circuit of the charge/discharge controller includes means for releasing the discharge inhibition.

According to the present invention which achieves the above objects, if the discharge inhibition state occurs because of a lowered voltage of the discharged storage battery and the discharge (supply of power) to a load is temporarily stopped, the discharge to the load is not resumed even if the voltage of the storage battery is raised by a supply of current from a power source, but the detected voltage by the charge/discharge controller is disregarded. Accordingly, it becomes possible to avoid unnecessary power consumption by the load and the exhaustion of the storage battery, thereby stabilizing the operation and improving the reliability.

The discharge inhibition is released after discarding the detected voltage, by using switching means such as a reset switch additionally provided. It is therefore possible to stabilize the operation.

DETAILED DESCRIPTION OF THE PREFERRED EMBODIMENTS

Preferred embodiments will be described with reference to the accompanying drawings.

(First Embodiment)

Figure 3:
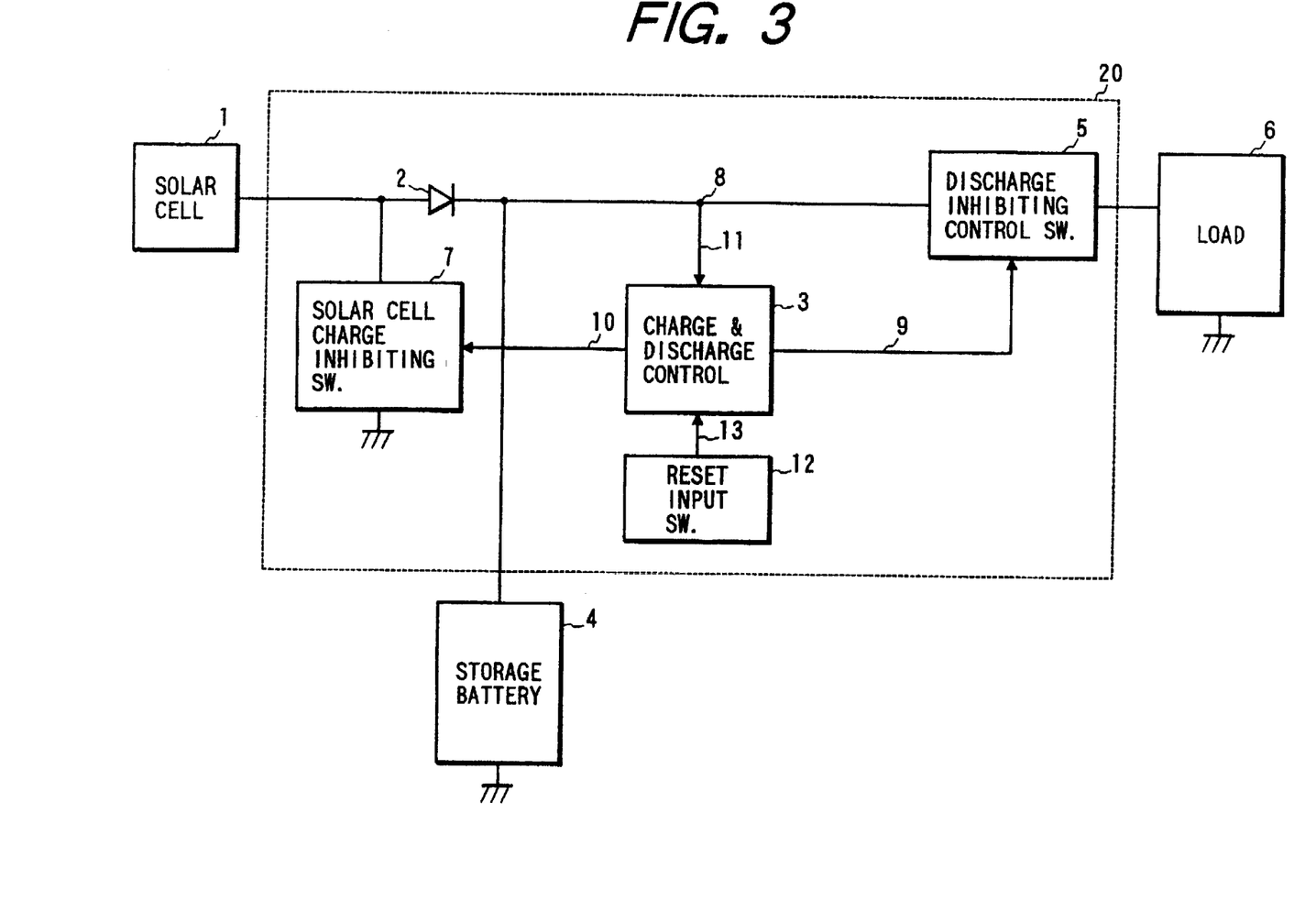
FIGS. 3, 5 and 7 are diagrams showing examples of the structure of a power generation system having a charge/discharge controller according to the present invention.

FIG. 3 is a diagram showing an example of the structure of a system according to a preferred embodiment of the invention. In FIG. 3, elements and signals which are the same as shown in FIG. 1 are represented by using identical reference numerals and characters, and the detailed description thereof is omitted.

As shown in FIG. 3, in this embodiment a reset input switch 12 is provided for supplying a discharge inhibition release command 13 to the charge/discharge controller 3. In this embodiment, the charge/discharge controller 3 does not turn on the discharge inhibition control semiconductor switching element 5 even if the voltage of the storage battery 4 reaches the predetermined value or larger. In other words, even if the voltage of the storage battery 4 takes the predetermined value or larger, the discharge inhibition is not released, but it is released only upon manipulation of the reset switch 12.

In this embodiment, therefore, even if the voltage of the storage battery rises after the discharge inhibition control signal 9 is outputted from the charge/discharge controller 3, the discharge will not start at once but will start only by the explicit intention of the user to release the discharge and supply power to the load 6.

The operation of the embodiment will be detailed with reference to the timing charts shown in FIGS. 4A to 4E.

Figure 4A:
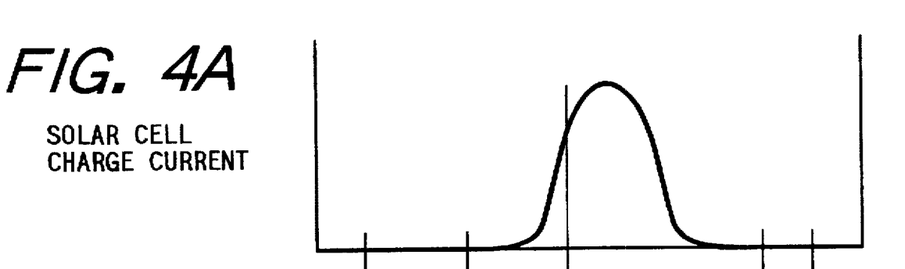
FIGS. 4A to 4E, 6A to 6E, and 8A to 8E are timing charts illustrating operation examples suitable for the power generation systems having a charge/discharge controller according to the present invention.
Figure 4B:
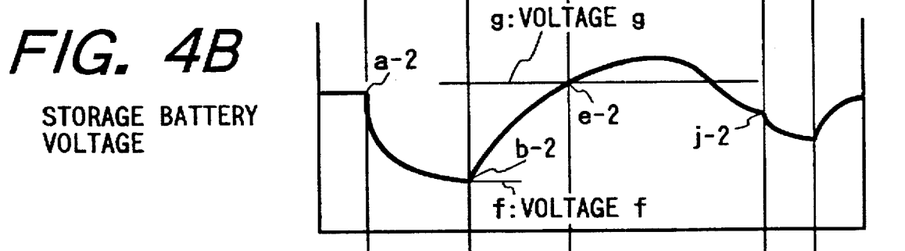
Figures 4C, 4D:
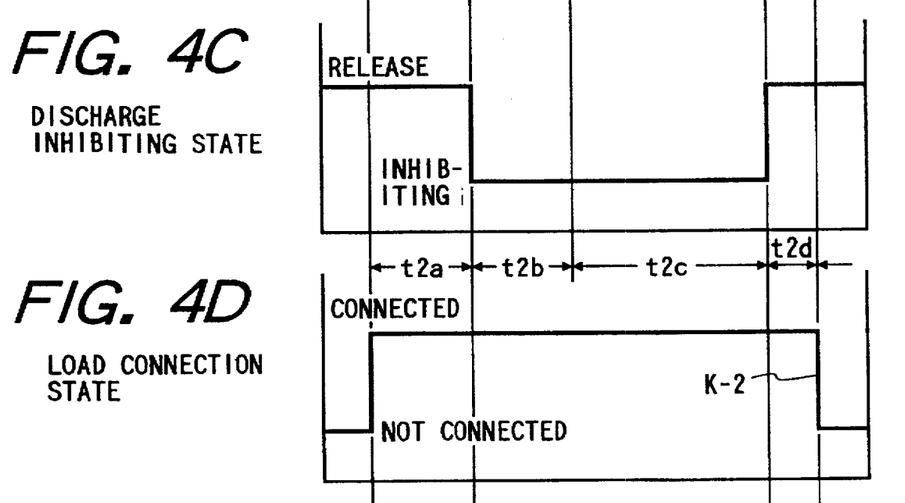
Figure 4E:
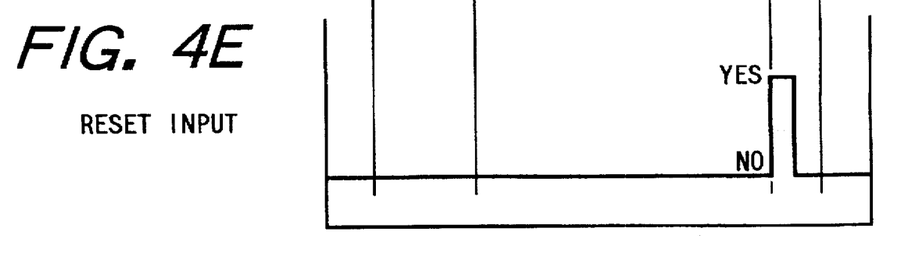

In FIGS. 4A to 4E, a change in a charge current of the solar cell is shown in FIG. 4A, a change in a voltage of the storage battery is shown in FIG. 4B, a waveform of the discharge inhibiting control signal 9 of FIG. 3 is shown in FIG. 4C, a connection state of the load is shown in FIG. 4D, and a waveform of the reset signal is shown in FIG. 4E.

In FIGS. 4A to 4E, f indicates a discharge inhibition voltage, g indicates a voltage at which a discharge inhibition by the charge/discharge controller is released, a-1 indicates a start timing of a load connection, b-1 b-2 indicates a discharge inhibition start timing at the discharge inhibition voltage f, e-2 indicates a timing when the storage battery takes the predetermined voltage g because of the charge of the solar cell, and when only the voltage detected by the charge/discharge controller is disregarded j-2 indicates a timing when a reset input is supplied during the night without sunshine, and when the discharge inhibition is released and power is supplied to the load 6, and k-2 indicates an end timing of the load connection.

It is assumed that the start timing of FIGS. 4A to 4E is set in a state in which substantially no electromotive force is generated in the solar cell 1 shown in FIG. 3 and substantially no current is stored via the reverse current stopper diode 2 into the storage battery 1, that the charge/discharge controller is not in the discharge inhibition state at this start timing, and that the load is connected at the timing a-2.

Under these conditions, the storage battery 4 is discharged as the time lapses and its voltage gradually lowers as indicated in FIG. 4B.

The voltage of the storage battery is detected by the storage battery voltage detector 8 and supplied to the charge/discharge controller 3. When the voltage lowers to the voltage f preset for the storage battery 4 at which the discharge is inhibited, the charge/discharge controller 3 outputs the discharge inhibiting control signal 9 and turns off the discharge inhibiting control semiconductor switching element 5. This timing is indicated at b-2 in FIG. 4B. When the discharge inhibiting control semiconductor switch is turned off, current will not flow through the load 6 so that the discharge of the storage battery 4 is stopped.

In this embodiment, when a supply of the power to the load 6 is stopped, the voltage of the storage battery 4 starts rising (in FIG. 4B). In this embodiment, even if the voltage of the storage battery exceeds the predetermined voltage g after the solar cell 1 starts generating power upon reception of light from the sun, the discharge inhibition is not released as shown in FIG. 4C. Therefore, the power generated by the solar cell is used for charging the storage battery 4. If an over discharge detector (not shown) for detecting an over discharge is provided in the charge/discharge controller 3, this detector may be reset when the voltage reaches the predetermined voltage f or g.

When light from the sun or the like is not applied thereafter at sunset to the solar cell 1, the voltage of the storage battery 4 gradually lowers. In this embodiment, power is not supplied to the load 6 until the reset input switch 12 is closed and the discharge inhibition release command 13 is supplied to the charge/discharge controller 3. In this example, the reset input switch is closed at a timing when the voltage of the storage battery 4 is lower than the voltage g and higher than the voltage f and while the solar cell 1 does not generate power. When the reset input switch 12 is closed, the discharge inhibition release command is supplied and the discharge inhibition is released so that the discharge inhibition control semiconductor switching element 5 is turned on to supply power to the load 6.

A timing indicated by k-2 is the time when the load 6 is disconnected.

As above, in this system, a discharge inhibition state caused by a voltage drop of the storage battery due to discharge and stopped discharge to the load (supply of power), is not released even when the voltage of the storage battery rises by a supply of current from a power source. Therefore, for example, a problem associated in an illumination device with a solar cell can be solved, the problem is that the power from the solar cell is not used for charging the storage battery and is consumed by the illumination device, being unable to sufficiently charge the storage battery. Therefore, the illumination device can be operated only when necessary in the night.

With the above charge/discharge control, power is not wastefully consumed during the charge period of the storage battery. Therefore, the storage battery can be efficiently charged and the system operation can be stabilized, improving the reliability of the whole system.

(Second Embodiment)

Figure 5:
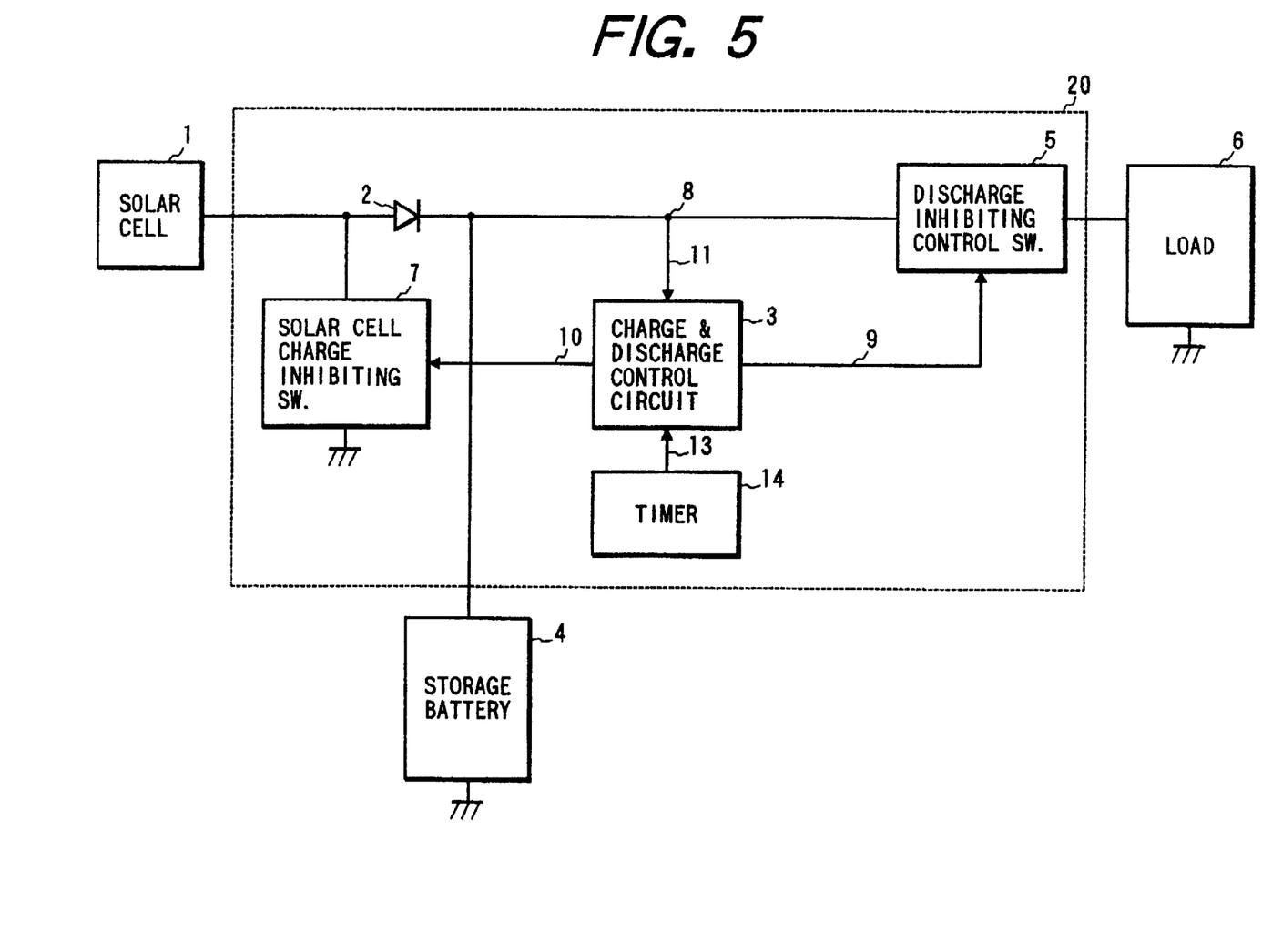

FIG. 5 is a diagram showing an example of the structure of a system according to another preferred embodiment of the invention. In FIG. 5, elements and signals like those shown in FIG. 1 are represented by using identical reference numerals and characters, and the detailed description thereof is omitted.

As shown in FIG. 5, in place of the reset input switch 12 of the first embodiment provided in the charge/discharge controller 3 for outputting the discharge inhibition release command 13, a timer 14 is used in this embodiment. In this embodiment, the charge/discharge controller 3 disregards the discharge inhibition control signal 9 and does not turn on the discharge inhibition control semiconductor switching element 5 even if the voltage of the storage battery 4 reaches the predetermined value or larger. The discharge inhibition is released, only in response to a signal output from the timer 14 or in response to closing a switch in the timer 14, by modifying control of the discharge inhibition control signal 9 and turning on the discharge inhibition control semiconductor switch 5.

An example of the timing chart illustrating the operation of the embodiment is shown in FIGS. 6A to 6E.

Figure 6A:
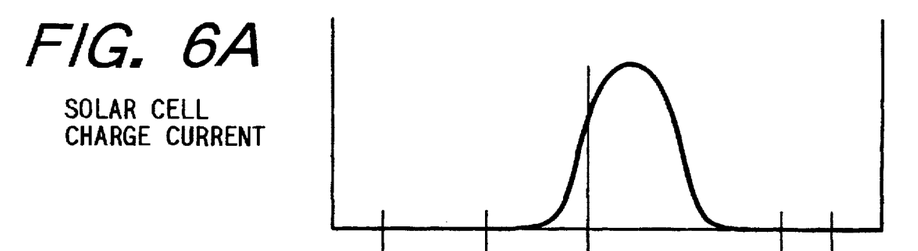
Figure 6B:
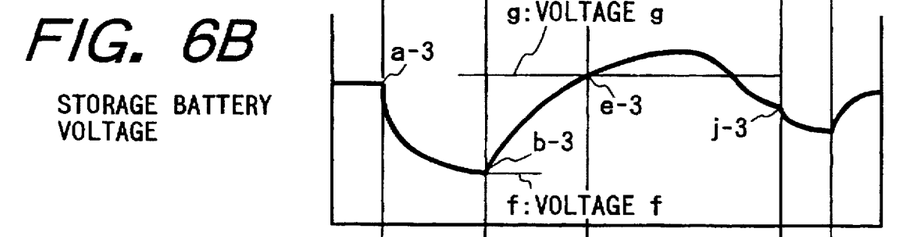
Figure 6C:
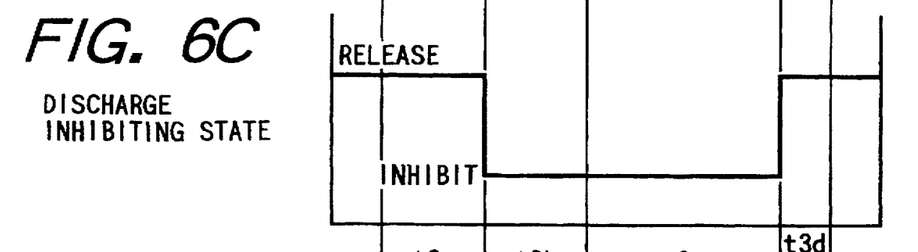
Figure 6D:
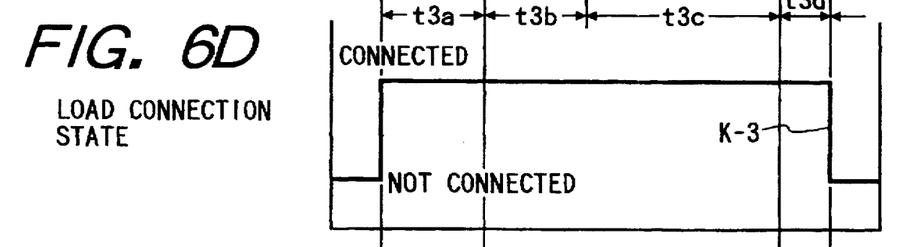
Figure 6E:
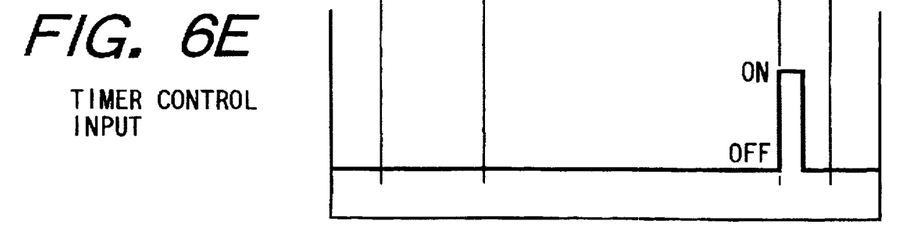

In FIGS. 6A to 6E, a change in a charge current of the solar cell is shown in FIG. 6A, a change in a voltage of the storage battery is shown in FIG. 6B, a waveform of the discharge inhibiting control signal 9 of FIG. 5 is shown in FIG. 6C, a connection state of the load is shown in FIG. 6D, and a waveform of a timer control input is shown in FIG. 6E.

In FIGS. 6A to 6E, f indicates a discharge inhibition voltage, g indicates a voltage at which a discharge inhibition by the charge/discharge controller is released, a-3 indicates a start timing of a load connection, b-3 indicates a discharge start timing at the discharge inhibition voltage f, e-3 indicates a timing when the storage battery takes the predetermined voltage g because of the charge of the solar cell, and when only the voltage detected by the charge/discharge controller is disregarded, j-3 indicates a timing when a reset input is supplied from the timer 14, and when the discharge inhibition is released and power is supplied to the load 6, and k-3 indicates an end timing of the load connection.

It is assumed that the start timing of FIGS. 6A to 6E is set in a state in which substantially no electromotive force is generated in the solar cell 1 shown in FIG. 5 and substantially no current is stored via the reverse current stopper diode 2 into the storage battery 1, that the charge/discharge controller is not in the discharge inhibition state at this start timing, and that the load is connected at the timing a-3.

Under these conditions, the storage battery 4 is discharged as the time lapses and its voltage gradually lowers as indicated in FIG. 6B.

The voltage of the storage battery is detected by the storage battery voltage detector 8 and supplied to the charge/discharge controller 3. When the voltage lowers to the voltage f preset for the storage battery 4 at which the discharge is inhibited, the charge/discharge controller 3 outputs the discharge inhibiting control signal 9 and turns off the discharge inhibiting control semiconductor switching element 5. This timing is indicated at b-3 in FIG. 6B. When the discharge inhibiting control semiconductor switch is turned off, current will not flow through the load 6 so that the discharge of the storage battery 4 is stopped.

In this embodiment, when a supply of the power to the load 6 is stopped, the voltage of the storage battery 4 starts rising (in FIG. 6B). In this embodiment, even if the voltage of the storage battery exceeds the predetermined voltage g after the solar cell 1 starts generating power upon reception of light from the sun, the discharge inhibition is not released as shown in FIG. 6C. Therefore, the power generated by the solar cell is used for charging the storage battery 4. If an over discharge detector (not shown) for detecting an over discharge is provided in the charge/discharge controller 3, this detector may be reset when the voltage reaches the predetermined voltage f or g.

When light from the sun or the like is not applied thereafter at sunset to the solar cell 1, the voltage of the storage battery 4 gradually lowers. In this embodiment, power is not supplied to the load 6 until the discharge inhibition release command 13 is supplied to the charge/discharge controller 3 in response to the timer control input 14. In this example, the reset input (discharge inhibition release command) by the timer control input 14 is supplied at a timing when the voltage of the storage battery 4 is lower than the voltage g and higher than the voltage f and while the solar cell 1 does not generate power. After a time preset by the timer lapses, the discharge inhibition release command is supplied and the discharge inhibition is released so that the discharge inhibition control semiconductor switching element 5 is turned on to supply power to the load 6.

In this embodiment, the reset input of the first embodiment shown in FIG. 4E is replaced by the timer control input shown in FIG. 6E. Therefore, although the reset input of the first embodiment is required to be manually entered, the timer control input of this embodiment can be automatically entered by the timer.

In addition to outputting the discharge inhibition control signal or closing the switch at a preset timing, the timer may automatically output the discharge inhibition release command or close the switch at a timing delayed by a predetermined time from when the discharge inhibition control signal is outputted or when the voltage of the storage battery reaches a predetermined value.

In this embodiment, use of an apparatus such as an illumination device can be automatically performed without manually closing the reset switch. If the switch is closed after a time lapse sufficient for charging the storage battery, a malfunction which might be caused by a manual switch can be eliminated.

Similar to the first embodiment, also in this embodiment, power is not wastefully consumed during the charge period of the storage battery. Therefore, the storage battery can be efficiently charged and the system operation can be stabilized, improving the reliability of the whole system.

(Third Embodiment)

Figure 7:
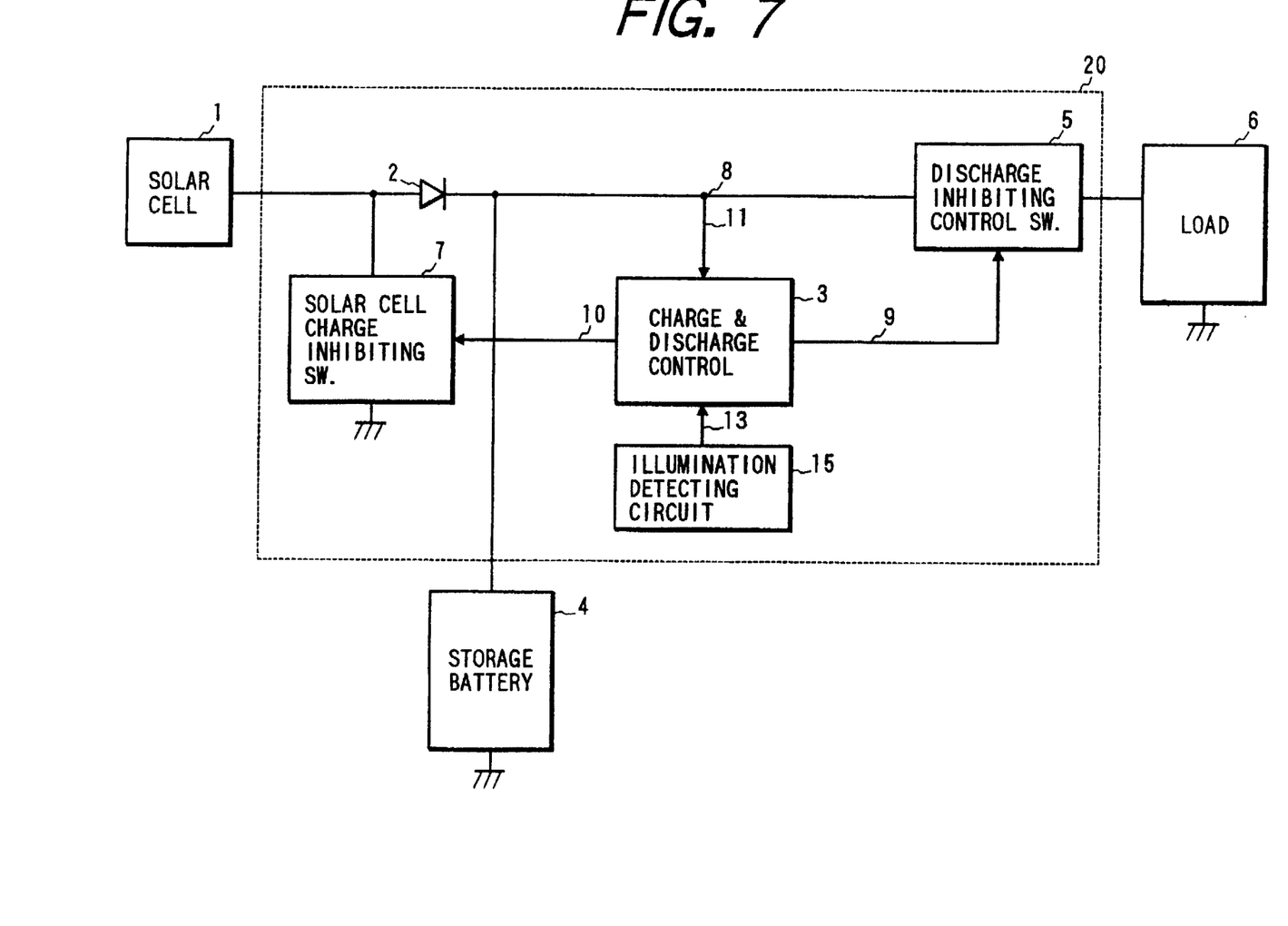

FIG. 7 is a diagram showing an example of the structure of a system according to another preferred embodiment of the invention. In FIG. 7, elements and signals like those shown in FIG. 1 are represented by using identical reference numerals and characters, and the detailed description thereof is omitted.

As shown in FIG. 7, in place of the reset input switch 12 of the first embodiment provided in the charge/discharge controller 3 for outputting the discharge inhibition release command 13, an illuminance detecting circuit 15 is used in this embodiment. The illuminance detector 15 detects an illuminance of light applied to the solar cell 1, and in accordance with the output (illuminance) thereof, the discharge inhibition release command is issued (or a switch is closed). In this embodiment, the charge/discharge controller 3 disregards inhibition control signal 9 and does not turn on the discharge inhibition control semiconductor switching element 5 even if the voltage of the storage battery 4 reaches the predetermined value or larger. The discharge inhibition is released, only in response to a signal output from the illuminance detector 15 or in response to closing a switch in the illuminance detector 15, by disregarding the discharge inhibition control signal 9 and turning on the discharge inhibition control semiconductor switch 5.

An example of the timing chart illustrating the operation of the embodiment is shown in FIGS. 8A to 8E. As shown, in this embodiment, the reset input of the first embodiment shown in FIG. 4E is replaced by a solar cell voltage (sunshine) input shown in FIG. 8E. This solar voltage input is automatically entered in accordance with a change in the luminance of light applied to the solar cell 1.

Figure 8A:
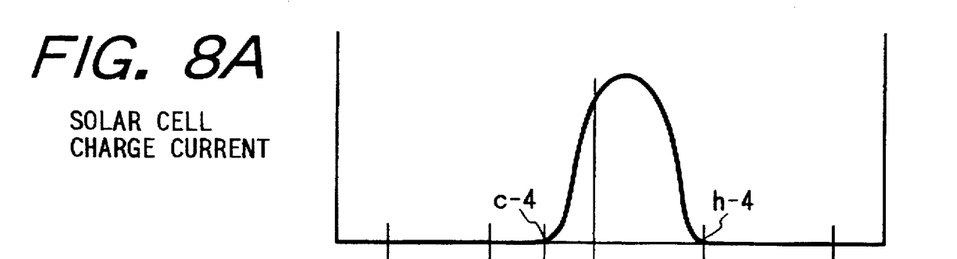
Figure 8B:
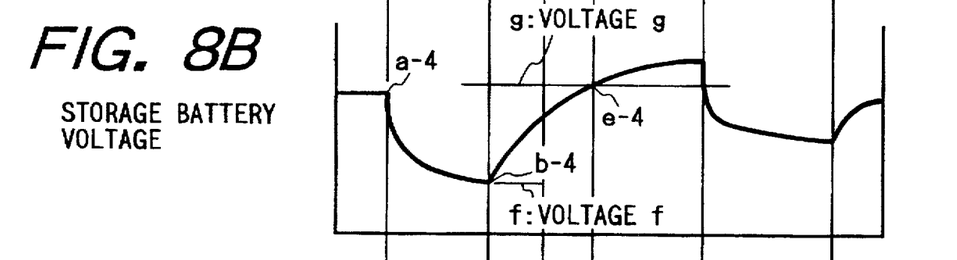
Figure 8C:
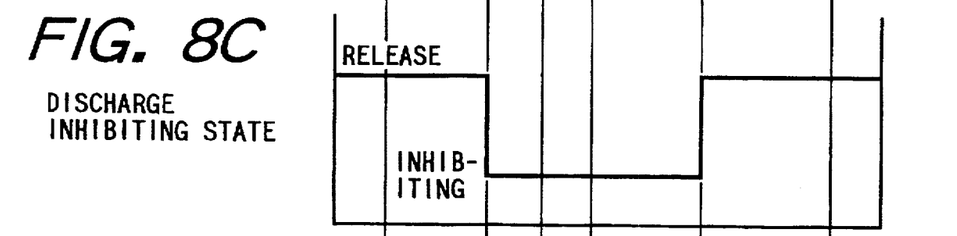
Figure 8D:
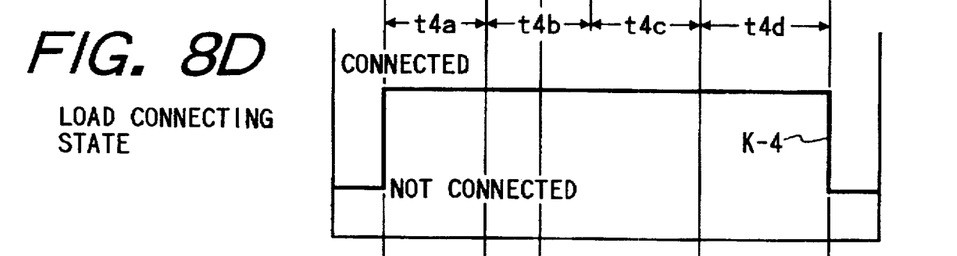
Figure 8E:
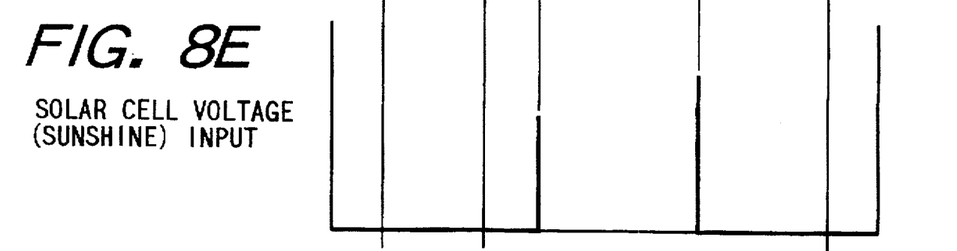

Specifically, in FIGS. 8A to 8E, a change in a charge current of the solar cell is shown in FIG. 8A, a change in a voltage of the storage battery is shown in FIG. 8B, a waveform of the discharge inhibiting control signal 9 of FIG. 7 is shown in FIG. 8C, a connection state of the load is shown in FIG. 8D, and a waveform of a solar cell voltage (sunshine) input is shown in FIG. 8E.

In FIGS. 8A to 8E, f indicates a discharge inhibition voltage, g indicates a voltage at which a discharge inhibition by the charge/discharge controller is released, a-4 indicates a start timing of a load connection, b-4 indicates a discharge start timing at the discharge inhibition voltage f, e-4 indicates a timing when the storage battery takes the predetermined voltage g because of the charge of the solar cell, and when only the voltage detected by the charge/discharge controller is disregarded, c-4 indicates a start timing of sunshine, h-4 indicates a timing when the discharge inhibition is released under no sunshine, and when power is supplied to the load 6, and k-4 indicates an end timing of the load connection.

It is assumed that the start timing of FIGS. 8A to 8E is set in a state in which substantially no electromotive force is generated in the solar cell 1 shown in FIG. 7 and substantially no current is stored via the reverse current stopper diode 2 into the storage battery 1, that the charge/discharge controller is not in the discharge inhibition state at this start timing, and that the load is connected at the timing a-4.

Under these conditions, the storage battery 4 is discharged as the time lapses and its voltage gradually lowers as indicated in FIG. 8B.

The voltage of the storage battery is detected by the storage battery voltage detector 8 and supplied to the charge/discharge controller 3. When the voltage lowers to the voltage f preset for the storage battery 4 at which the discharge is inhibited, the charge/discharge controller 3 outputs the discharge inhibiting control signal 9 and turns off the discharge inhibiting control semiconductor switching element 5. This timing is indicated at b-4 in FIG. 8B. When the discharge inhibiting control semiconductor switch is turned off, current will not flow through the load 6 so that the discharge of the storage battery 4 is stopped.

In this embodiment, when a supply of the power to the load 6 is stopped, the voltage of the storage battery 4 starts rising (in FIG. 8B). In this embodiment, even if the voltage of the storage battery exceeds the predetermined voltage g after the solar cell 1 starts generating power upon reception of light from the sun, the discharge inhibition is not released as shown in FIG. 8C. Therefore, the power generated by the solar cell is used for charging the storage battery 4. If an over discharge detector (not shown) for detecting an over discharge is provided in the charge/discharge controller 3, this detector may be reset when the voltage reaches the predetermined voltage f or g.

When light from the sun or the like is not applied thereafter at sunset to the solar cell 1, no illuminance is detected by the illuminance detector 15. At this timing, the illuminance detector 15 supplies the discharge inhibition release command 13 to the charge/discharge controller 3. Therefore, the discharge inhibition is released and the discharge inhibition control semiconductor switching element 5 is closed and power is supplied to the load 6.

The solar cell charge inhibition switching element 7 is used for preventing an output of the solar cell 1 from being stored in the storage battery, and is normally short-circuited in many cases. This element 7 operates in response to a charge inhibition control signal 10 from the charge/discharge controller 3 to avoid over charge. During the short-circuit state, the illuminance (output of the solar cell) cannot be detected in this embodiment. Therefore, if an output of the solar cell 1 is used for generating another control signal as in this embodiment, the short-circuit by the solar cell charge inhibition switching element 7 is released during the period of illuminance detection. Illuminance detection by photoelectric conversion means is not limited only to the solar cell, but other devices such as photosensors including phototransistors and photodiodes may also be used. In the latter case, the solar cell is not required to be released from the short-circuit state, and the operation of the solar cell charge inhibition switching element 7 can be maintained as it is. However, it is preferable to use the solar cell as the illuminance detecting element from the viewpoint of simple system and low cost.

With the charge/discharge control described above, a discharge inhibition state caused by a voltage drop of the storage battery due to discharge and stoppage of discharge to the load (supply of power), is not released even the voltage of the storage battery rises by a supply of current from a power source. Therefore, for example, a problem associated in an illumination device with a solar cell can be solved, the problem is that the power from the solar cell is not used for charging the storage battery and is consumed by the illumination device, being unable to sufficiently charge the storage battery. Therefore, the illumination device can be operated only when necessary in the night.

According to this embodiment, use of an apparatus such as an illumination device can be automatically performed without a manual work of closing a reset switch. The system can be operated relatively efficiently for apparatuses required to operate in the night, particularly, illumination devices, and a malfunction which might be caused by a manual switch can be eliminated.

Similar to the first embodiment, also in this embodiment, power is not wastefully consumed during the charge period of the storage battery. Therefore, the storage battery can be efficiently charged and the system operation can be stabilized, improving the reliability of the whole system.

Namely, with the charge/discharge control described above, power is not wastefully consumed during the charge period of the storage battery, and the storage battery can be efficiently charged and the system operation can be stabilized, so that the reliability of the whole system can be improved.

As described so far, according to the present invention, it is possible to provide a charge/discharge method, a charge/discharge controller, and a system with the charge/discharge controller, capable of allowing an output of a power source of a power generator such as a solar cell to be charged even if discharge inhibition is once effected, and improving the system reliability.

Further, according to the present invention, a load of the system can be operated only when necessary, through the charge/discharge control and a conventional problem can be solved. The conventional problem is that a discharge inhibition state caused by a voltage drop of the storage battery due to discharge and stopped discharge to the load (supply of power), is not released even when the voltage of the storage battery rises by a supply of current from a power source. Therefore, in a system with a solar cell, power from the solar cell is not used for charging the storage battery and is consumed by the load, being unable to sufficiently charge the storage battery.

Still further, according to the present invention, the reliability of the whole system can be improved, the operation of the system can be stabilized, and the storage battery can be efficiently charged, because power is not consumed wastefully during the charge period of the storage battery by not releasing the discharge inhibition through monitoring a voltage of the storage battery.

Namely, according to the present invention, power is not wastefully consumed during the charge period of the storage battery, and the storage battery can be efficiently charged and the system operation can be stabilized, so that the reliability of the whole system can be improved.

Still further, according to the present invention, since the discharge inhibition is released in response to a timer or an output of the solar cell, use of the system can be automatically and efficiently performed without manually closing the reset switch, and a malfunction which might be caused by a manual switch can be eliminated.

In the above description of this invention, a solar cell is used as an example of a d.c. power source having an unstable output. Such a power source is not limited only to the solar cell, but the invention is also applicable to other power sources using unstable energy sources in the natural world, including solar heat, earth heat, wind power, wave power, tidal power, water power, and etc.

The switching element is not limited to a semiconductor switching element (e.g., transistor), but mechanical switching means (e.g., relay) may also be used so long as it has a similar function to the semiconductor switching element.

The invention should not be limited only to the above embodiments. Various modifications and combinations are possible without departing from the scope and spirit of the prevent invention defined in the claims.

What is claimed is:

1. A power generation system comprising a solar cell and a load connected through a first wiring, and a storage battery connected through a second wiring to a node on said first wiring between said solar cell and said load, wherein:

a first setting value preliminary set for preventing a state of discharging from said storage battery, and a second setting value preliminary set at a value greater than the first setting value for releasing the prevention of the discharging from the discharging prevention state of said storage battery are designated; and control means for controlling a connecting state of said first wiring, so that, starting a power supply by the discharging from said storage battery to said load thereby reducing a voltage of said storage battery according to a power consumption of said load, when the voltage of said storage battery reaches the first setting value, said control means sets at a disconnecting state said first wiring between said node and said load thereby preventing the discharging from said storage battery; and so that, charging said storage battery with an output from said solar cell, when the voltage of said storage battery reaches the second setting value, said control means changes the disconnecting state of said first wiring into the connecting state thereby releasing the state of preventing the discharging from said storage battery to said load to supply the power from said storage battery to said load.

2. A power generation system comprising a solar cell and a load connected through a first wiring, and a storage battery connected through a second wiring to a node on said first wiring between said solar cell and said load, wherein:

a first setting value preliminary set for preventing a state of discharging from said storage battery, a second setting value preliminary set at a value greater than the first setting value for releasing the prevention of the discharging from the discharging prevention state of said storage battery, and a third setting value preliminary set for preventing an excessively charged state of said storage battery are designated; and control means for controlling a connecting state of said first wiring, so that, starting a power supply by the discharging from said storage battery to said load thereby reducing a voltage of said storage battery according to a power consumption of said load, when the voltage of said storage battery reaches the first setting value, said control means sets at a disconnecting state said first wiring between said node and said load thereby preventing the discharging from said storage battery;

so that, charging said storage battery with an output from said solar cell, when the voltage of said storage battery reaches the second setting value, said control means changes the disconnecting state of said first wiring into the connecting state thereby releasing the state of preventing the discharging from said storage battery to said load to supply the power from said storage battery to said load; and so that, when the voltage of said storage battery charged with the output from said solar cell reaches the third setting value, said control means sets at a disconnecting state the first wiring between said node and said solar cell.

* * * * *

UNITED STATES PATENT AND TRADEMARK OFFICE
CERTIFICATE OF CORRECTION

PATENT NO. : 5,751,133

DATED : May 12, 1998

INVENTOR(S) : HIROSHI SATO ET AL.

It is certified that error appears in the above-identified patent and that said Letters Patent is hereby corrected as shown below:

COLUMN 5

Line 32, "a-1" should read --a-2--.

Line 33, "b-1" should be deleted.

Line 38, "disregarded" should read --disregarded,--.

COLUMN 11

Line 21, "preliminary" should read --preliminarily--.

Line 23, "preliminary" should read --preliminarily--.

COLUMN 12

Line 8, "preliminary" should read --preliminarily--.

Line 10, "preliminary" should read --preliminarily--.

UNITED STATES PATENT AND TRADEMARK OFFICE
CERTIFICATE OF CORRECTION

PATENT NO. : 5,751,133

DATED : May 12, 1998

INVENTOR(S) : HIROSHI SATO ET AL.

It is certified that error appears in the above-identified patent and that said Letters Patent is hereby corrected as shown below:

<u>COLUMN 12</u>

Line 15, "nary" should read --narily--.

Signed and Sealed this

Second Day of March, 1999

Attest:

Q. TODD DICKINSON

*Attesting Officer*     *Acting Commissioner of Patents and Trademarks*